United States Patent
Clute

(10) Patent No.: US 7,963,473 B2
(45) Date of Patent: Jun. 21, 2011

(54) RETRACTOR WITH PRETENSIONER

(75) Inventor: Gunter K. Clute, Bloomfield Hills, MI (US)

(73) Assignee: Autoliv ASP, Inc., Ogden, UT (US)

( * ) Notice: Subject to any disclaimer, the term of this patent is extended or adjusted under 35 U.S.C. 154(b) by 900 days.

(21) Appl. No.: 11/222,130

(22) Filed: Sep. 8, 2005

(65) Prior Publication Data

US 2006/0082127 A1    Apr. 20, 2006

Related U.S. Application Data

(63) Continuation-in-part of application No. 11/115,583, filed on Apr. 27, 2005, and a continuation-in-part of application No. 10/968,504, filed on Oct. 19, 2004, now Pat. No. 7,318,607.

(51) Int. Cl.
*B60R 22/28* (2006.01)
*B60R 22/36* (2006.01)
*B60R 22/46* (2006.01)

(52) U.S. Cl. ...................... 242/374; 242/379.1

(58) Field of Classification Search .................. 242/374, 242/379.1; 280/805, 806, 807; 297/472, 297/475–478, 480; 60/635
See application file for complete search history.

(56) References Cited

U.S. PATENT DOCUMENTS

| | | | |
|---|---|---|---|
| 5,244,231 A * | 9/1993 | Bauer et al. .................... 280/807 |
| 5,344,095 A | 9/1994 | Frei |
| 5,415,431 A | 5/1995 | Omura |
| 5,522,564 A * | 6/1996 | Schmidt et al. ................ 242/374 |
| 5,526,996 A * | 6/1996 | Ebner et al. .................... 242/374 |
| 5,607,118 A * | 3/1997 | Dybro et al. ................. 242/379.1 |
| 5,788,281 A | 8/1998 | Yanagi et al. |
| 5,881,962 A | 3/1999 | Schmidt et al. |
| 5,906,327 A | 5/1999 | Chamings |
| 5,924,641 A | 7/1999 | Keller et al. |
| 5,938,135 A | 8/1999 | Sasaki et al. |
| 6,012,667 A | 1/2000 | Clancy, III et al. |
| 6,105,894 A | 8/2000 | Singer et al. |
| 6,241,172 B1 * | 6/2001 | Fugel et al. ................. 242/379.1 |
| 6,416,006 B1 * | 7/2002 | Huber ......................... 242/379.1 |
| 6,416,007 B1 * | 7/2002 | Stegmeier ................... 242/379.1 |
| 6,443,380 B1 * | 9/2002 | Biller et al. .................... 242/374 |
| 6,592,064 B2 | 7/2003 | Clute et al. |
| 6,616,081 B1 | 9/2003 | Clute et al. |
| 6,616,186 B1 | 9/2003 | Midorikawa et al. |
| 6,626,463 B1 | 9/2003 | Arima et al. |
| 6,641,075 B2 | 11/2003 | Specht |
| 6,655,743 B1 * | 12/2003 | Parizat et al. .................. 297/477 |
| 6,659,505 B1 | 12/2003 | Knox |
| 6,659,549 B1 | 12/2003 | Still et al. |

(Continued)

FOREIGN PATENT DOCUMENTS

DE    10122910 B4    10/2004

(Continued)

*Primary Examiner* — Michael R Mansen
*Assistant Examiner* — Scott Haugland
(74) *Attorney, Agent, or Firm* — Sally J. Brown; Brinks Hofer Gilson & Lione

(57) ABSTRACT

A retractor includes a pretensioner whereby increased control and variation over the load limitation characteristics of the retractor are provided. The seat belt and spool are linked to a locking mechanism through a first force limiting element, while the pretensioner is linked to the seat belt and spool through a second force limiting element. A selectively actuatable clutch is provided to operatively link the pretensioner to the spool via the second force limiting element.

22 Claims, 4 Drawing Sheets

U.S. PATENT DOCUMENTS

| | | | |
|---|---|---|---|
| 6,698,677 B1 * | 3/2004 | Happ et al. | 242/374 |
| 6,702,326 B1 | 3/2004 | Fujii | |
| 6,719,325 B2 | 4/2004 | Ingemarsson | |
| 6,726,250 B2 | 4/2004 | Ennerdal | |
| 6,729,649 B1 | 5/2004 | Schmidt | |
| 6,729,693 B2 | 5/2004 | Soderstrom et al. | |
| 6,749,225 B1 | 6/2004 | Clute et al. | |
| 6,969,089 B2 | 11/2005 | Klingauf et al. | |
| 7,273,191 B2 | 9/2007 | Clute et al. | |
| 7,290,730 B2 | 11/2007 | Nagata et al. | |
| 7,318,560 B2 | 1/2008 | Clute | |
| 7,318,607 B2 | 1/2008 | Clute | |
| 7,354,014 B2 * | 4/2008 | Hiramatsu | 242/379.1 |
| 7,360,795 B2 | 4/2008 | Zelmer et al. | |
| 7,458,534 B2 | 12/2008 | Pech et al. | |
| 2001/0008262 A1 * | 7/2001 | Huber | 242/379.1 |
| 2002/0166914 A1 | 11/2002 | Specht | |
| 2003/0019969 A1 * | 1/2003 | Webber et al. | 242/379.1 |
| 2003/0094326 A1 * | 5/2003 | Specht | 180/268 |
| 2004/0021029 A1 | 2/2004 | Eberle et al. | |
| 2005/0139711 A1 * | 6/2005 | Bell et al. | 242/379.1 |
| 2005/0178870 A1 * | 8/2005 | Loffler et al. | 242/374 |
| 2006/0082127 A1 | 4/2006 | Clute | |
| 2006/0082128 A1 | 4/2006 | Clute | |
| 2006/0124793 A1 | 6/2006 | Keller et al. | |
| 2006/0124794 A1 | 6/2006 | Clute et al. | |
| 2006/0243843 A1 | 11/2006 | Clute | |

FOREIGN PATENT DOCUMENTS

| | | |
|---|---|---|
| EP | 1415872 A1 | 6/2004 |
| WO | WO 03/082640 A1 | 10/2003 |
| WO | WO 2004/065181 A1 | 5/2004 |

* cited by examiner

RETRACTOR WITH PRETENSIONER

CROSS-REFERENCE TO RELATED PATENT APPLICATIONS

This patent application is a continuation-in-part of corresponding U.S. patent application Ser. No. 10/968,504, filed Oct. 19, 2004 now U.S. Pat. No. 7,318,607, and is also a continuation-in-part of corresponding U.S. patent application Ser. No. 11/115,583, filed Apr. 27, 2005. All of the foregoing applications are hereby incorporated by reference in their entirety.

FIELD OF THE INVENTION

The present invention relates generally to seat belt restraint apparatus for restraining an occupant of an automobile, and more particularly relates to a retractor having a pretensioner for controlling load limitation aspects of the restraint system.

BACKGROUND OF THE INVENTION

Seat belt restraint systems for automobiles often include a pretensioner which is structured to apply tension to the seat belt when an impact event such as an accident situation is detected. When the pretensioner is activated, the pretensioner eliminates any slack in the seat belt, and thus controls the physical space between the occupant and the seat belt. In this manner, the occupant of the seat is coupled with the seat belt as the occupant initially moves forward relative to the seat, thereby controllably restraining the occupant, reducing occupant excursion, and preventing undue loads when the occupant moves forwardly into the seat belt.

A retractor is another standard component of a seat belt restraint system which includes a spool receiving the webbing material of the seat belt. The spool is used to wind up and store the webbing. Generally, the spool is locked in place upon detection at an impact situation in order to restrain the occupant via the seat belt. Recently, retractors have been designed having one or more force limiting elements which are structured to allow the spool to rotate and pay out the webbing material of the seat belt upon reaching predetermined force levels between the occupant and seat belt. In this manner, the restraint force imposed on the occupant can be limited in a controlled manner, thereby providing a certain load limitation characteristics.

Despite these and other improvements to automobile restraint systems, there remains a need to provide a retractor that includes a pretensioner while providing increased control and variation over the load limitation characteristics of the retractor system.

BRIEF SUMMARY OF THE INVENTION

The present invention provides a retractor having a pretensioner that provides increased control and variation over the load limitation characteristics of the retractor system. The retractor generally includes a spool receiving a portion of the seat belt wound thereon, which is rotatable to retract or pay out the seat belt. A first force limiting element is connected to the spool, and a locking mechanism is operatively connected to the spool through the first force limiting element to prevent paying out of seat belt, such as during an impact event. However, the first force limiting element provides some limited paying out of the seat belt in order to control the belt forces imposed on the occupant. A second force limiting element is connected to the spool. The pretensioner has a drive mechanism operatively connected to the spool through the second force limiting element. A selectively actuatable clutch is positioned between the second force limiting element and one of the spool or the drive mechanism. The selectively actuatable clutch controls force transmission between the spool and the drive mechanism, thereby providing greater control over the load limitation characteristics of the retractor.

According to more detailed aspects, the selectively actuatable clutch includes an initial position and an activated position, wherein the initial position couples the drive mechanism and the spool for force transmission, and the activated position decouples the drive mechanism and the spool. The clutch may further include a deactivated position that again couples the drive mechanism in the spool. The selectively actuatable clutch preferably includes a clutch driving mechanism having a pyrotechnic charge. The retractor may further include a second selectively actuable clutch, one being positioned between the second force limiting element and the spool, the other being positioned between the second force limiting element and the drive mechanism. In this case, one of the clutches has an initial position decoupling the drive mechanism or spool from the second force limiting element, while the other clutch has an initial position coupling the drive mechanism or spool and the second force limiting element.

According to another embodiment of the present invention, a method is provided for restraining an occupant of an automobile. The method includes providing a retractor having a pretensioner, a spool, a first force limiting element, a second force limiting element and a locking mechanism, preferably constructed as described above. A selectively actuatable clutch is provided interposed between the second force limiting element and one of the drive mechanism or the spool. The method includes switching the clutch drive mechanism to an activated position decoupling the second force limiting element to one of the drive mechanism and the spool. According to more detailed aspects the switching step occurs on detection on an impact event. The method may further include switching the clutch drive mechanism to a deactivated position coupling the second force limiting element from one of the drive mechanism or the spool. Further, the drive mechanism of the pretensioner may be activated upon detection of an impact event to attract seat belt onto the spool, and the drive mechanism may be blocked throughout the impact event to provide load limitation via the second force limiting element.

BRIEF DESCRIPTION OF THE DRAWINGS

The accompanying drawings incorporated in and forming a part of the specification illustrate several aspects of the present invention, and together with the description serve to explain the principles of the invention. In the drawings.

DETAILED DESCRIPTION OF THE INVENTION

Figure 1:
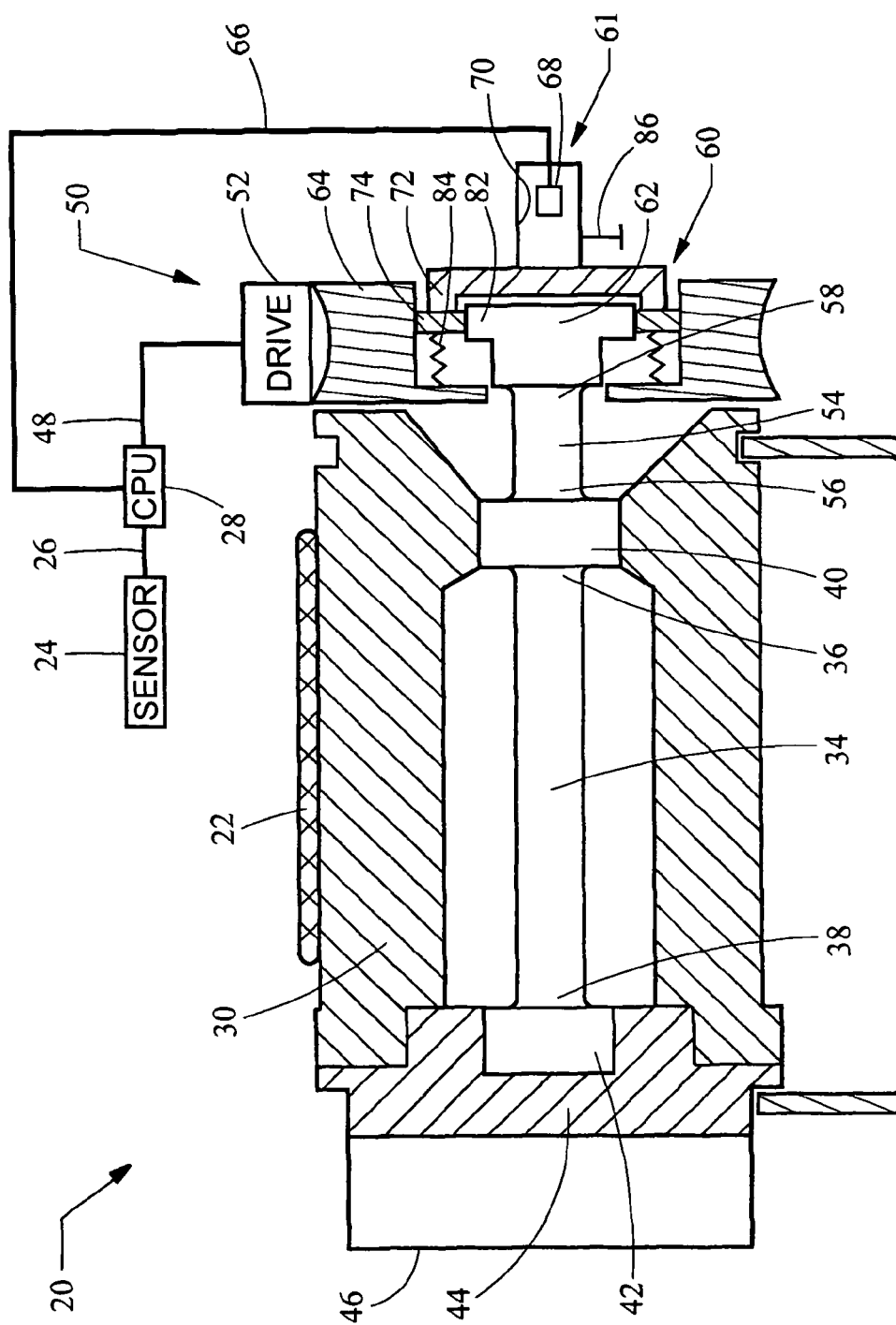
FIG. 1 is a cross-sectional view of a retractor constructed in accordance with the teachings of the present invention.

Turning now to the figures, FIG. 1 depicts a cross-sectional view of a retractor 20 constructed in accordance with the teachings of the present invention. The retractor 20 is adapted for an automobile having a seat belt 22 restraining an occupant (not shown). As is known in the art, the vehicle includes an impact sensor 24 sending a signal 26 indicative of an impact event such as a crash event. Any impact sensor that is or will be known to those skilled in the art may be readily employed in conjunction with the retractor 20 of the present invention. An electronic control unit 28 such as a central processing unit (CPU) or other controller receives the signal 26 and controls the vehicle's response to the same.

As is known in the art, during normal use the retractor 20 is used to wind up the seat belt 22 about a spool 30 which is rotatably mounted to a frame 32 of the retractor 20. The spool 30 is coupled to a first force limiting element 34, which preferably comprises a torsion rod or torque bar, as is also known in the art. It will be recognized that other types of force limiting elements other than torsion rods may be employed in conjunction with the present invention, including sleeves, rings or tubes. The first force limiting element 34 generally includes a first end 36 and a second end 38. The first end 36 is connected to the spool 30 via a coupling 40, while the second end 38 is connected to a profiled head 44 via another coupling 42. Preferably, the coupling 40 is constructed as a low-profile spline as disclosed in U.S. patent application Ser. No. 11/008,308 filed Dec. 9, 2004, the disclosure of which is incorporated herein by reference in its entirety.

The retractor 20 further includes an end assembly 46 which includes a locking mechanism that selectively engages the profiled head 44 and second end 38 of torsion bar 34 during an impact event such as a vehicle collision, providing an "emergency locking retractor" function as is well known in the art. For example, end assembly 46 is of the type disclosed in U.S. Pat. Nos. 6,616,081; 6,012,667; and 5,924,641, the disclosures of which are hereby incorporated by reference in their entirety. Through blocking of the profiled head 44, the spool 30 is prevented from rotating and the occupant is restrained by the seat belt 22. However, the retractor 20 and first force limiting element 34 also provide a low load limitation function in order to limit the restraint force imposed on the occupant. Upon reaching a predetermined restraint force, the spool 30 will begin to rotate and "pay out" the seat belt 22 by actuation of the first force limiting element 34. That is, upon reaching a predetermined force, the torsion rod 36 will twist to allow some rotation of the spool 30 (as well as coupling 40 and first end 36) relative to the profiled head 44 (and hence relative to coupling 42 and second end 38) which is fixed by the locking mechanism of end assembly 46. In this manner, a low load limitation characteristic is provided by the torsion of the first force limiting element 34 to allow limited pay out of the seat belt 22 wound on the spool 30.

Also shown in FIG. 1, the retractor 20 includes a pretensioner 50 for pretensioning the seat belt 22 through the retractor 20. The pretensioner 50 is activated by the electronic control unit 28 via a pretension signal 48. In particular, a drive mechanism 52 is actuated to effectuate rotation of the spool 30 via a second force limiting element 54. A first end 56 of the second force limiting element 54 is connected to the spool 38 via the shared coupling 40, although it will be recognized that the first end 56 may be directly attached to the spool 30 or include its own coupling. The drive mechanism 52 of the pretensioner 50 is connected to the second end 58 of the second force limiting element 54 by way of a clutch 60 and a coupling 62 at the second end 58 of the second force limiting element. Preferably, the drive mechanism 52 is initially disengaged from the pinion 64 so that the spool 130 may freely rotate during normal operation of the retractor 20. As is known, upon activation of the pretensioner 50, the drive mechanism 52 engages the pinion 64 for transmitting force therebetween.

The drive mechanism 52 may take many forms, such as an electric motor or pyrotechnic drive,. One exemplary pretensioner having a pyrotechnic drive is disclosed in U.S. Patent No. 5,881,962, the disclosure of which is incorporated by reference herein in its entirety. Upon detection of an impact event, the drive mechanism 52 is activated and engages the pinion 64, which in turn operates through the clutch 60 and the second force limiting element 54 to rotate the spool 30 and retract seat belt onto the spool 30. That is, the seat belt is pretensioned to remove any slack between the seat belt 22 and the occupant. Then, the drive mechanism 52 of the pretensioner 50 is blocked in order to block further rotation of the spool 30, including protraction or "paying out" of the seat belt. The pretensioner 50 may be blocked by maintaining the pressure of the pyrotechnic charge, and/or by a separate blocking element, such as is disclosed in U.S. patent application No. 11/222,411, filed on Sep. 08, 2005, the disclosure of which is incorporated herein by reference in its entirety.

At about the same time as the blocking of the pretensioner 50, the profiled head 44 is blocked by the locking mechanism. Thus, through activation of the pretensioner 50, rotation of the spool 30 is blocked through both the first and second load limiting elements 34, 54, providing a high load limitation function to control the restraint force imposed on the occupant.

For increased control over the level of load limitation provided by the retractor 20, the clutch 60 is constructed to permit selective connection of the pretensioner 50 and its pretensioner drive 52 to the second force limiting element 54 and spool 30. More specifically, the initial position of the clutch 60 connects the pretensioner 50 to the spool 30 for pretensioning of the seat belt 22 and high load limitation through blocking of the pretensioner 50, as described above. The activated position of the clutch 60 decouples the pretensioner 50 and spool 30, as will be described below. Generally, the CPU 28 will generate a clutch signal 66 to decouple the pretensioner 50, based on such factors as occupant type or size (i.e. $5^{th}$ percentile occupant), crash severity or type of impact event, and the firing of other passive restraints such as air bags or other restraint apparatus.

Figure 2:
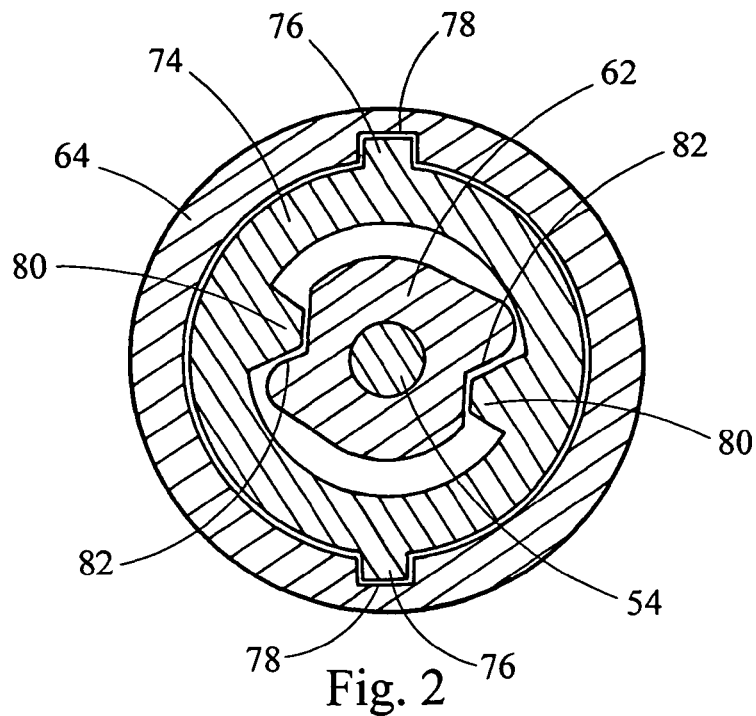
FIG. 2 is another cross-sectional view of the retractor depicted in FIG. 1.

Upon receiving a clutch signal 66 from the CPU 28, a clutch drive 61 includes pyrotechnic charge 68 or other combustible material that is ignited inside a combustion chamber 70. The pressure in the chamber 70 presses on a driving element 72 which engages a hub 74. As shown in FIG. 2, the hub 74 is interposed between the pinion 64 of the drive mechanism 52 and the coupling 62 of the second force limiting element 54. The hub 74 includes a tongue 76 received in a groove 78 of the pinion 64, thereby rotatably coupling the two pieces. Similarly, the hub 74 includes at least one shank 80 projecting radially inwardly for engagement with a shoulder 82 of the coupling 62. As best seen in FIG. 1, upon axial translation of the hub 74 by the driving element 72, the hub 74 may be positioned in and out of engagement with the coupling 62 of the second force limiting element 54.

Further, the clutch 60 includes a spring 84 or other resilient member biasing the hub 72 into a position engaged with the coupling 62. As such, the clutch 60 includes an initial position where the pretensioner drive mechanism 52 is operatively coupled to the second force limiting element 54 and spool 30. In an activated position, the hub 74 is driven such that the clutch 60 operatively decouples the drive mechanism 52 and the spool 30 via the second force limiting element 54. Finally, it can also be seen in FIG. 1 that the clutch 60 includes a relief valve 86 coupled to the combustion chamber 70. As such, pressure within the chamber 70 may be selectively released (such as via another clutch signal 66 or other direct signal) and the hub 74 retracted axially, thereby providing a deactivated position where the drive mechanism 52 is again coupled to the second force limiting element 54 and spool 30.

Figure 3:
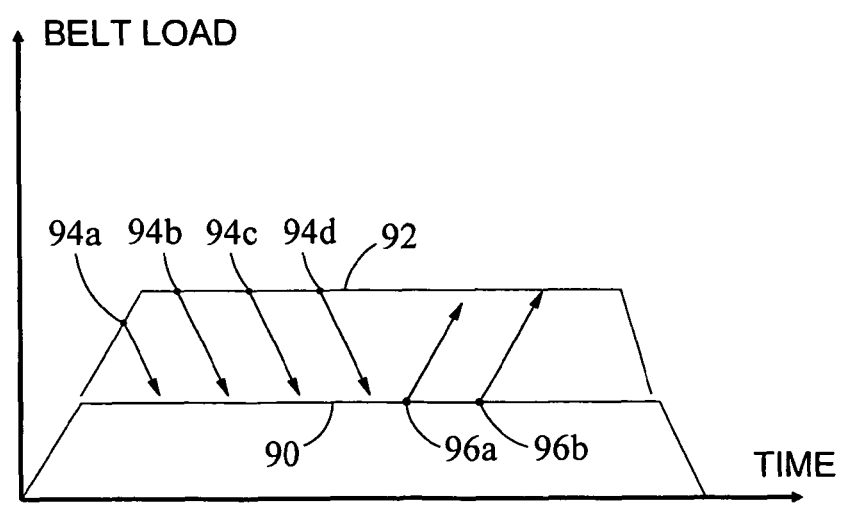
FIG. 3 is a graph depicting the belt load over time in the retractor of FIG. 1.
Figure 4:
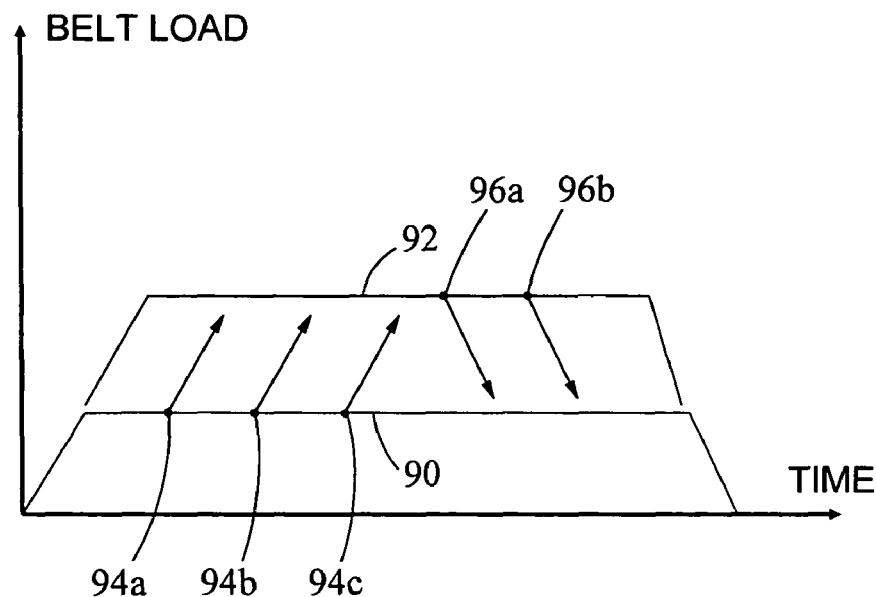
FIG. 4 is another graph depicting the belt load over time in the retractor of FIG. 1.

The load limitation characteristics provided by the retractor 20 and pretensioner 50, as controlled through the clutch 60 will now be described with reference to the graphs depicted in FIGS. 3 and 4 which present idealized data. In the figures, the Y-axis represents belt load while the X-axis represents time. Upon detection of an impact event, the CPU 28 will send a pretensioning signal 48 to the pretensioner 50 to initiate its drive mechanism 52. The pretensioner drive mechanism 52 rotates the spool 30 via the second force limiting element 54 until the pretensioner 50 is blocked. At about the same time, the pretensioner 50 is blocked, the profiled head 44 blocks the second end 38 of the first load limiting element 34, and rotation of the spool 30 is prevented except through the controlled rotation provided by the first and second force limiting elements 34, 54. As such, the load limitation provided by the first and second force limiting elements 34, 54 are superimposed to provide a high load limitation characteristic depicted as line 92 in FIG. 3. At any point during the impact event (such as points 94, 94b, 94c, 94d), the CPU 28 may determine that a lower load limitation level is desired, and thus send the clutch signal 66 to activate the clutch 60. As previously discussed, in the activated position the clutch 60 decouples the pretensioner drive mechanism 52 from the second force limiting element 54 and spindle 30. In this activated position of the clutch 60, the load limitation is provided solely through the first load limiting element 34, which provides a low load limitation characteristic, indicated by line 90. Similarly, if at some point 96a, 96b CPU 28 determines higher load limitation is desired, a clutch signal 66 may again be sent to deactivate the clutch through the relieving pressure in the chamber 70 via relief valve 86.

It will also be recognized by those skilled in the art that the initial, activated and deactivated positions of the clutch 60 may be reversed, as will be described with reference to FIG. 4. For example, if the shoulders 82 of the coupling 62 were moved to the left side of the coupling 62 in FIG. 1, such that the hub 74 is not initially in engagement with the shoulders 82 of coupling 62, the initial position of the clutch 60 would be to decouple the pretensioner drive mechanism 52 and the second force limiting element 52, 54. Thus, upon activation of this reversed clutch mechanism 60, the pretensioner drive mechanism 52 would be coupled to the spool 30 via the second force limiting element 54, and upon deactivation of the clutch 60 the drive 52 and spool 30 would again be decoupled. As such, when an impact event is detected and the CPU 28 decides not to fire the pretensioner 50, the profiled head 44 may be locked to provide a low load limitation characteristic 90. Then, the CPU 28 could initiate the pretensioner drive mechanism 52, and when the pretensioner 50 is blocked, activate the clutch 60 to provide load limitation through both the first and second load limiting elements 34, 54. Thus, at any point 94a, 94b, 94c in time the retractor 20 can be switched to a high load limitation characteristic as indicated by line 92. Finally, the clutch 60 could then be deactivated at another point in time 96a, 96b in order to return to low load limitation 90 through the first force limiting element 34.

Figure 5:
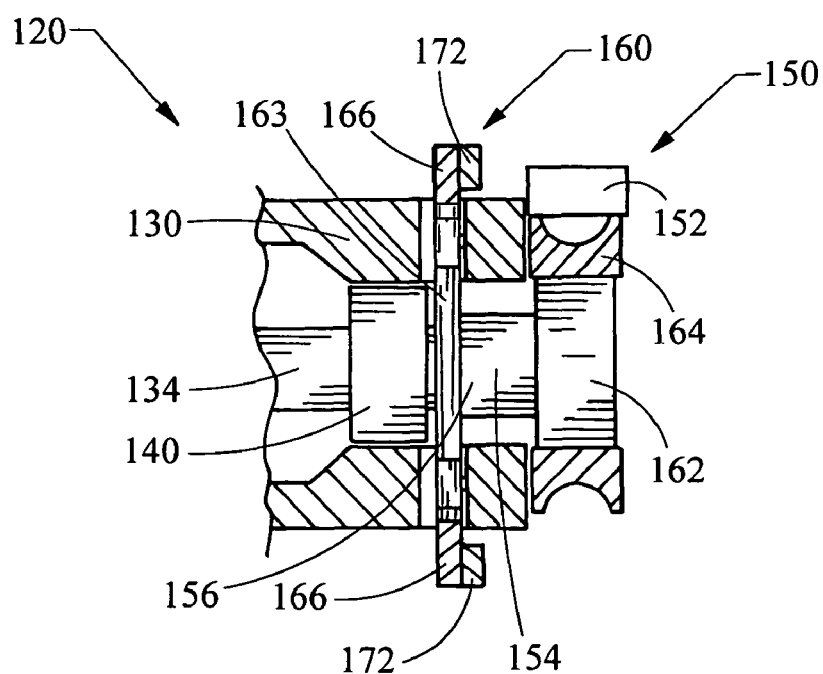
FIG. 5 is a cross-sectional view of another embodiment of a retractor constructed in accordance with the teachings of the present invention.
Figure 6:
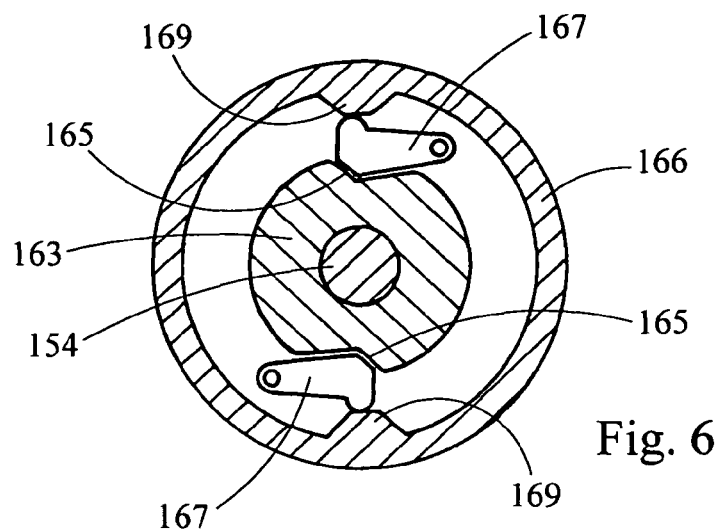
FIG. 6 is another cross-sectional view of the retractor depicted in FIG. 5.
Figure 7:
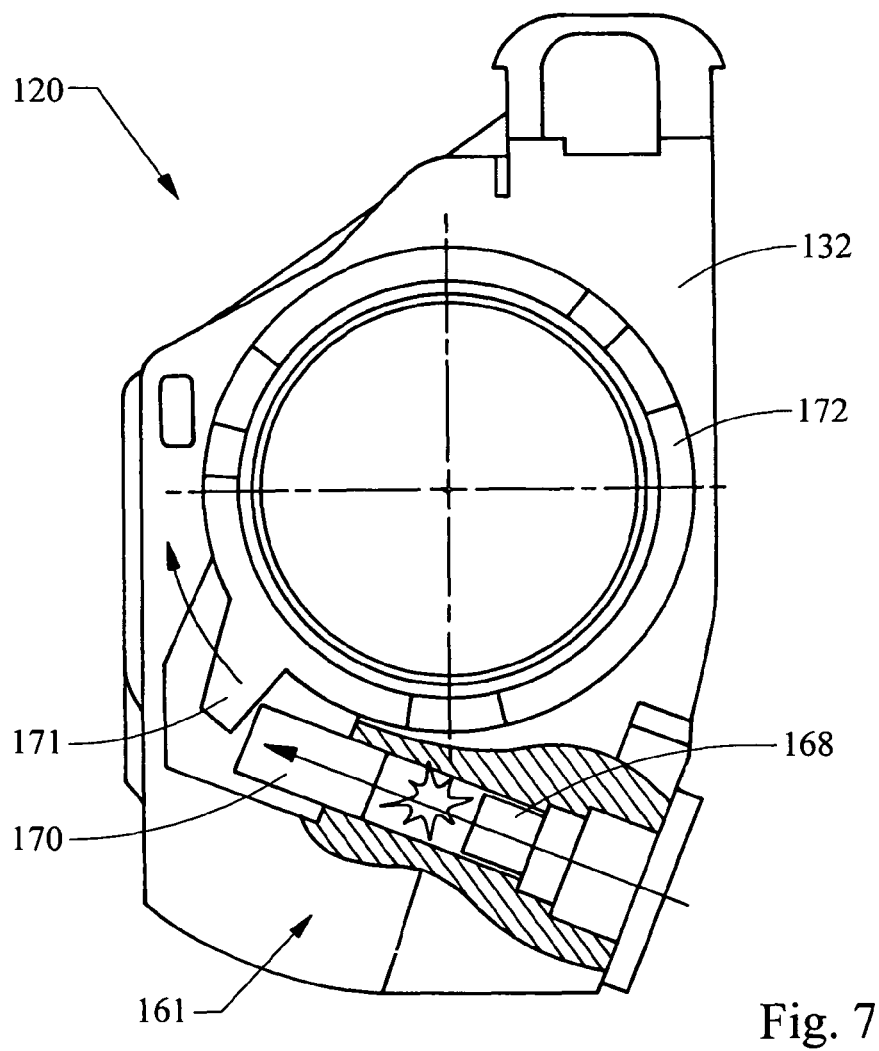
FIG. 7 is a side view, partly in cross-section, depicting the retractor of FIG. 5.

Turning now to FIGS. 5, 6 and 7, another embodiment of the retractor 120 having a pretensioner 150 has been depicted in accordance with the teachings of the present invention. Generally, the retractor 120 and the pretensioner 150 with its drive 152 are of a substantially similar construction as the prior embodiment described with reference to FIGS. 1-4. In this embodiment, however, the clutch mechanism 160 is provided between the second force limiting element 154 and the spool 130. As in the prior embodiment, the spool 130 is rotatably mounted and is coupled to a first load limiting element 134 via a coupling 140. Here, the second force limiting element 154 does not share the coupling 140, but rather includes its own coupling 163 at its first end 156. As best seen in FIG. 6, the coupling 163 defines a pair of shoulders 165 which are sized to receive a pair of coupling pawls 167. The pawls 167 are pivotally mounted to the spool 130 for rotation in and out of engagement with the shoulders 165. Engagement of the pawls 167 with the shoulders 165 is maintained by the provision of a spool ring 166 that is axially translatable. In FIG. 5, the spool ring 166 has been shown in the engaged position, wherein a pair of tabs 169 project radially inwardly to prevent rotation of the coupling pawls 167 and force engagement with the coupling 163 of the second force limiting element 154. Thus, in this initial position shown in FIGS. 5 and 6, force transmission from the second load limiting element 154 to the spool 130 is provided through the clutch 160.

As best seen in FIG. 7, axial translation of the spool ring 166 is effected through a set collar 172 which is arranged in the frame 132 of the retractor 120. The clutch 160 includes a drive 161 having a pyrotechnic charge 168 that impacts a piston 170 causing its linear movement. In its linear movement, the piston 170 acts on a shoulder 171 projecting radially from the set collar 172, such that the set collar 172 is caused to rotate when the piston 170 is actuated. The set collar 172 is connected to the frame 132 such that it does not rotate during the normal function of the spool 130, but can perform a limited rotational movement during its adjusting motion. Particularly, the set collar 172 is supported against the frame 132 by inclined ramps (not shown) such that through rotation of the set collar 172 axial displacement occurs, thereby forcing axial displacement of the spool ring 166 by virtue of their adjacent position.

Another embodiment of the retractor 20, 120 could employ multiple clutches, such as both clutch 60 and clutch 160 previously described. In this case, the pretensioner drive 52, 152 can be initially engaged with the pinion 64, 164, which would occur at about the same time as the actuation of the pretensioner 50, 150 to force transmission.

It will be recognized by those skilled in the art that the retractor 20 of the present invention provides increase adaptability and control over the load limitation characteristics imposed by the retractor and seat belt on an occupant, by providing additional load limitation through a second force limiting element and activation of the pretensioner which can be selectively controlled via the clutch 60. Further, the retractor 20 reduces or eliminates "locking dip", which as used in the industry describes the phenomena of loss of belt load when the torque load is transferred from the pretensioner to the blocking element which blocks the profiled head to activate the force limiting element. By activating the pretensioner, and maintaining the activation of the second force limiting element while the first force limiting element is activated through blocking of the tread head, "locking dip" is substantially eliminated.

The foregoing description of various embodiments of the invention has been presented for purposes of illustration and description. It is not intended to be exhaustive or to limit the invention to the precise embodiments disclosed. For example, it will be recognized by those skilled in the art that while the first ends 36, 56 of the first and second force limiting elements 34, 54 are located adjacent each other and are rigidly connected to the spool 30, the second force limiting element 54 and the pretensioner 50 could be connected to the second end 38 of the first force loading element 34, and more specifically connected to the profiled head 44. It will also be recognized that the first and second load limiting elements 34, 54 may be formed out of a single torsion bar wherein the opposing free ends of the bar would be selectively blocked (either via the locking mechanism or the pretensioner drive 52) to cause load limitation through the force limiting elements 34, 54. Further, the second force limiting element 54 could be a hollow tube which slides around a reduced diameter end of the torsion rod 34 forming the first force limiting element 34.

Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

The invention claimed is:

1. A retractor for a seat belt restraining system for restraining an occupant of an automobile having a sensor detecting an impact event, the retractor comprising:
   a spool receiving a portion of the seat belt;
   a first force limiting element connected to the spool;
   a locking mechanism operatively connected to the spool through the first force limiting element;
   a second force limiting element connected to the spool;
   a pretensioner having a drive mechanism including a rotatable pinion operatively connected to the spool through the second force limiting element; and
   a selectively actuatable clutch positioned between the second force limiting element and one of the spool or the drive mechanism, the selectively actuatable clutch coupling and decoupling the drive mechanism and the spool independently of activation of the pretensioner and the drive mechanism and independently of rotation of the spool, wherein the selectively actuatable clutch is positioned between the second force limiting element and the pinion of the drive mechanism, and includes a hub and a clutch drive mechanism, the hub, pinion and second force limiting element including corresponding engagement features, the clutch drive mechanism axially translating the hub to engage the pinion and second force limiting element, the hub being positioned radially in-between the second force limiting element and the pinion, activation of the selectively actuatable clutch controlling force transmission between the spool and the drive mechanism of the pretensioner.

2. The retractor of claim 1, wherein the selectively actuatable clutch includes an initial position and an activated position, and wherein the initial position decouples the drive mechanism and the spool, and the activated position couples the drive mechanism and the spool for force transmission.

3. The retractor of claim 2, wherein the selectively actuatable clutch further includes a deactivated position that again decouples the drive mechanism and the spool.

4. The retractor of claim 3, wherein the clutch drive mechanism includes a pyrotechnic charge, and a selectively actuatable relief valve for switching to the deactivated position.

5. The retractor of claim 1, wherein the clutch drive mechanism includes a pyrotechnic charge.

6. The retractor of claim 1, wherein the hub defines a projecting shank forming the engagement feature of the hub, and wherein the second force limiting element defines a shoulder forming the engagement feature of the second force limiting element.

7. The retractor of claim 6, wherein the shank is non-rotatably attached to the hub.

8. The retractor of claim 1, wherein the hub is biased to an engaged position.

9. The retractor of claim 1, wherein the initial position of the clutch directly couples the pinion of the drive mechanism to the second force limiting element through the clutch.

10. The retractor of claim 1, wherein rotation of the spool is blocked through the second force limiting element only after the pretensioner is activated and the clutch transmits force between the spool and the pretensioner.

11. The retractor of claim 1, wherein the selectively actuatable clutch is actuatable to decouple the rotatable pinion from the spool independently of rotation of the spool.

12. The retractor of claim 1, wherein the selectively actuatable clutch is actuatable to couple the rotatable pinion to the spool independently of rotation of the spool.

13. The retractor of claim 1, wherein the second force limiting element has a first end connected to the spool and a second end directly connected to the selectively actuatable clutch.

14. The retractor of claim 1, wherein the selectively actuatable clutch couples the drive mechanism and the spool during normal, non-emergency, operation of the retractor.

15. The retractor of claim 1, wherein the hub is non-rotatably fixed to the pinion and selectively connected to the second force limiting element, the hub directly engaging the second force limiting element when connected thereto.

16. The retractor of claim 1, wherein the hub is positioned radially in-between the second force limiting element and the pinion.

17. A method for restraining an occupant of an automobile having seat belt securing the occupant and a sensor detecting an impact event, the method comprising:
   providing a retractor having a pretensioner, a spool, a first force limiting element, a second force limiting element, and a locking mechanism, the spool receiving a portion of the seat belt, the first force limiting element operatively connecting the spool and locking mechanism, the pretensioner having a drive mechanism including a rotatable pinion, the second force limiting element operatively linking the spool and drive mechanism;
   providing a selectively actuatable clutch interposed between the second force limiting element and one of the drive mechanism or the spool, the selectively actuatable clutch including a clutch drive that actuates the clutch, the selectively actuatable clutch having an initial position where the clutch drive is not activated and an activated position where the clutch drive is activated the selectively actuatable clutch coupling and decoupling the drive mechanism and the spool independently of activation of the pretensioner and the drive mechanism and independently of rotation of the spool wherein the selectively actuatable clutch is positioned between the second force limiting element and the pinion of the drive mechanism and includes a hub and a clutch drive mechanism, the hub, pinion and second force limiting element including corresponding engagement features, the hub being axially translatable by the clutch drive mechanism to engage the pinion and second force limiting element, the hub being positioned radially in-between the second force limiting element and the pinion; and axially translating the hub by the clutch drive mechanism and switching the selectively actuatable clutch to the activated position to change the coupling of the second force limiting element and one of the drive mechanism or the spool.

18. The method of claim 17, wherein the switching step occurs upon detection of an impact event.

19. The method of claim 17, further comprising the step of switching the selectively actuatable clutch to a deactivated position coupling the second force limiting element to one of the drive mechanism or the spool.

20. The method of claim 17, further comprising the step of activating the drive mechanism of the pretensioner upon detection of an impact event to retract seat belt onto the spool.

21. The method of claim 20, further comprising the step of blocking the drive mechanism of the pretensioner throughout the impact event to provide load limitation via the second force limiting element.

22. The method of claim 17, wherein the initial position of the selectively actuatable clutch couples the drive mechanism to the spool for rotational force transmission to wind-up the seat belt onto the spool.

* * * * *